US011221724B2

(12) United States Patent
Cramer

(10) Patent No.: US 11,221,724 B2
(45) Date of Patent: Jan. 11, 2022

(54) METHOD FOR CONTROLLING A DISPLAY APPARATUS FOR A MOTOR VEHICLE, DISPLAY APPARATUS FOR A MOTOR VEHICLE AND MOTOR VEHICLE HAVING A DISPLAY APPARATUS

(71) Applicant: AUDI AG, Ingolstadt (DE)

(72) Inventor: Stephanie Cramer, Garching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/317,930

(22) PCT Filed: Jul. 6, 2017

(86) PCT No.: PCT/EP2017/067002
§ 371 (c)(1),
(2) Date: Jan. 15, 2019

(87) PCT Pub. No.: WO2018/019544
PCT Pub. Date: Feb. 1, 2018

(65) Prior Publication Data
US 2019/0227675 A1 Jul. 25, 2019

(30) Foreign Application Priority Data
Jul. 26, 2016 (DE) .................... 10 2016 213 687.9

(51) Int. Cl.
*G06F 3/0481* (2013.01)
*B60K 37/02* (2006.01)
(Continued)

(52) U.S. Cl.
CPC ............ *G06F 3/0481* (2013.01); *B60K 37/02* (2013.01); *G02B 27/01* (2013.01);
(Continued)

(58) Field of Classification Search
CPC .... G02B 27/01; G02B 27/00; G02B 2027/00; G06F 3/048; B60K 37/02; B60K 37/00; B60K 2370/00
See application file for complete search history.

(56) References Cited

U.S. PATENT DOCUMENTS

2003/0128436 A1* 7/2003 Ishii ...................... G02B 27/01
359/630
2007/0096445 A1* 5/2007 Breed .................... B60N 2/002
280/735
(Continued)

FOREIGN PATENT DOCUMENTS

| CN | 103210434 A | 7/2013 |
| CN | 105398369 A | 3/2016 |

(Continued)

OTHER PUBLICATIONS

International Search Report and Written Opinion of the International Searching Authority dated Oct. 17, 2017 in corresponding International application No. PCT/EP2017/067002; 21 pages including Partial English-language translation.
(Continued)

*Primary Examiner* — Jennifer N Welch
*Assistant Examiner* — Qi Wan
(74) *Attorney, Agent, or Firm* — Maier & Maier, PLLC

(57) ABSTRACT

A method for controlling a display apparatus comprising a head-up display or a motor vehicle, in which, depending on a signal provided by a sensor device, a height adjustment and/or a rotation of a depiction of a piece of information dependent on the signal is carried out autonomously through a control device. In this case, the signal correlates with a color and/or a brightness of a projection background and/or correlates with a relative movement between the projection background and a projection surface. Through the method, it is possible to ensure an especially good and reliable
(Continued)

perceptibility of the depicted piece of information. The invention further relates to a display apparatus for a motor vehicle that is equipped to carry out the method and to a motor vehicle having such a display apparatus.

9 Claims, 1 Drawing Sheet

(51) Int. Cl.
G02B 27/01 (2006.01)
G02B 27/64 (2006.01)
G06F 3/0489 (2013.01)

(52) U.S. Cl.
CPC ....... *G02B 27/0101* (2013.01); *G02B 27/644* (2013.01); *G06F 3/04897* (2013.01); *B60K 2370/149* (2019.05); *B60K 2370/1529* (2019.05); *B60K 2370/18* (2019.05); *B60K 2370/188* (2019.05); *B60K 2370/334* (2019.05); *G02B 2027/0141* (2013.01); *G02B 2027/0183* (2013.01); *G02B 2027/0198* (2013.01)

(56) References Cited

U.S. PATENT DOCUMENTS

| 2008/0048930 | A1* | 2/2008 | Breed | B60N 2/002 |
| | | | | 345/7 |
| 2011/0001639 | A1 | 1/2011 | Sasaki et al. | |
| 2012/0224060 | A1* | 9/2012 | Gurevich | B60R 1/00 |
| | | | | 348/148 |
| 2013/0144521 | A1* | 6/2013 | Mathieu | G01C 21/365 |
| | | | | 701/410 |
| 2013/0181823 | A1 | 7/2013 | Stä hlin et al. | |
| 2014/0097968 | A1 | 4/2014 | Kamiya et al. | |
| 2014/0293433 | A1* | 10/2014 | Hashimoto | G02B 27/01 |
| | | | | 359/630 |
| 2014/0379260 | A1* | 12/2014 | Maihoefer | G01C 21/365 |
| | | | | 701/538 |
| 2015/0123879 | A1* | 5/2015 | Aboshi | G09F 9/00 |
| | | | | 345/7 |
| 2016/0068097 | A1 | 3/2016 | Langkabel et al. | |
| 2016/0091756 | A1* | 3/2016 | Watano | G02B 27/0101 |
| | | | | 349/11 |
| 2016/0147073 | A1 | 5/2016 | Onda et al. | |
| 2016/0216521 | A1 | 7/2016 | Yachida et al. | |
| 2017/0038595 | A1* | 2/2017 | Kutomi | G02B 27/01 |
| 2019/0171011 | A1* | 6/2019 | Ogasawara | B60K 35/00 |

FOREIGN PATENT DOCUMENTS

| DE | 43 38 579 A1 | 7/1994 |
| DE | 198 16 647 A1 | 10/1999 |
| DE | 100 60 536 A1 | 6/2002 |
| DE | 10 2007 035 505 A1 | 1/2009 |
| DE | 10 2009 041 205 A1 | 3/2011 |
| DE | 10 2009 045 169 A1 | 3/2011 |
| DE | 10 2012 001 951 A1 | 8/2013 |
| DE | 10 2015 007 485 A1 | 2/2016 |
| DE | 20 2015 104 499 U1 | 9/2016 |
| WO | 2015/060193 A1 | 4/2015 |
| WO | 2015/159500 A1 | 10/2015 |

OTHER PUBLICATIONS

Examination Report dated May 23, 2017 of corresponding German application No. 10 2016 213 687.9; 11 pages including Partial/Human-generated/Machine-generated English-language translation.

International Preliminary Report on Patentability dated Nov. 19, 2018 in corresponding International application No. PCT/EP2017/067002; 36 pages.

Notification of Transmittal of Translation of the International Preliminary Report on Patentability dated Jan. 31, 2019, in connection with corresponding international Application No. PCT/EP2017/067002 (9 pgs.).

Office Action dated Jul. 22, 2021 in corresponding Chinese Application No. 201780046984.9; 15 pages including English-language translation.

* cited by examiner

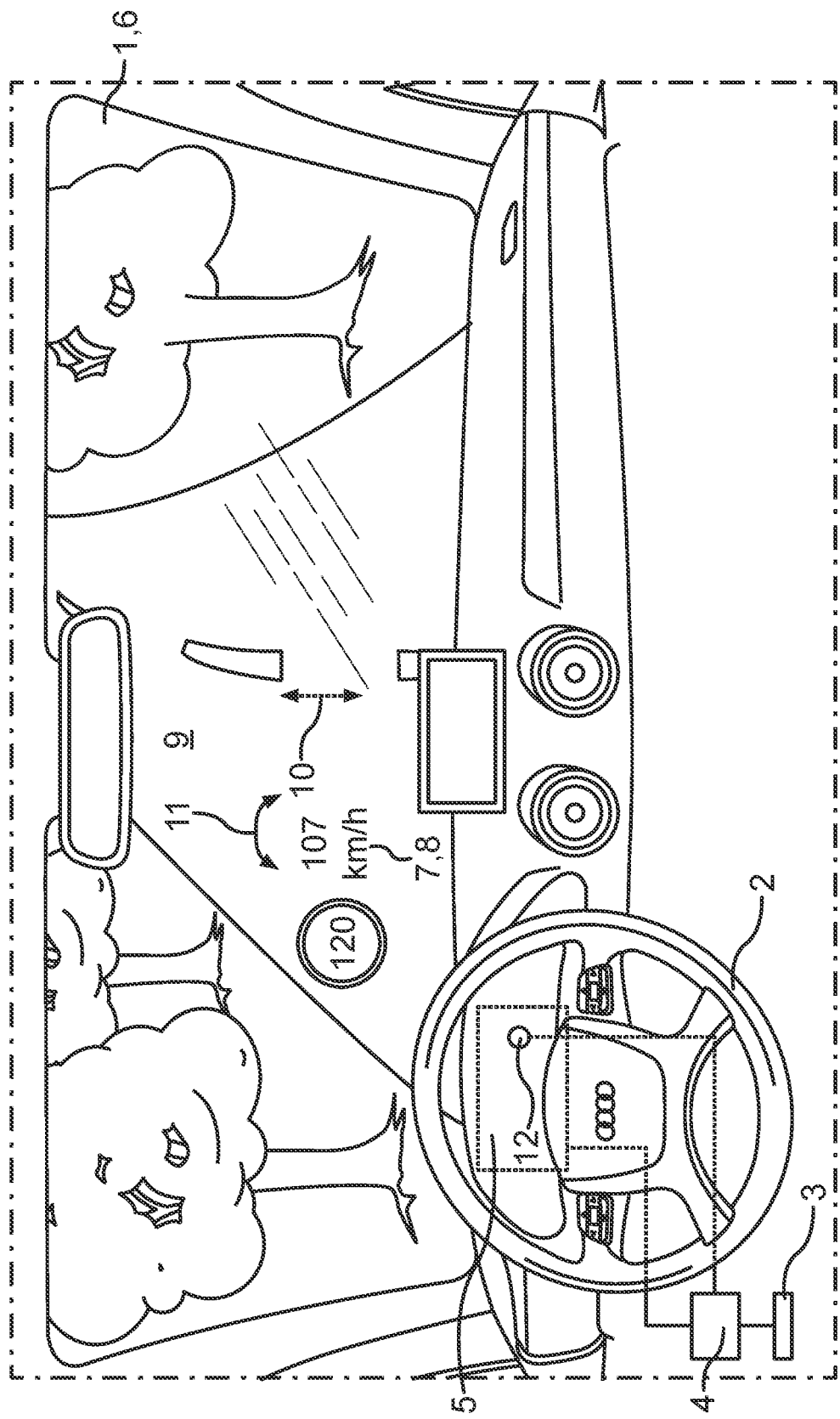

METHOD FOR CONTROLLING A DISPLAY APPARATUS FOR A MOTOR VEHICLE, DISPLAY APPARATUS FOR A MOTOR VEHICLE AND MOTOR VEHICLE HAVING A DISPLAY APPARATUS

BACKGROUND

The invention relates to a method for controlling a display apparatus including a head-up display for a motor vehicle.

DE 10 2009 041 205 A1 describes a method for controlling a display apparatus in a vehicle, which is designed as a head-up display, as well as a corresponding apparatus for carrying out such a method. In the method, a roadway surface in front of the vehicle is captured by a camera, the signals of which are analyzed in terms of the brightness level and/or color level of the roadway surface in the field of view of the observer and are used for adjusting the brightness in order to optimize the contrast of a depiction projected by means of the head-up display. For the brightness control and/or color control of the projection signal of the head-up display, it is also possible to take into consideration automatically various angles of observation and fields of view between the observer and a windshield of the vehicle, on which the image of the head-up display is projected, over the vanishing point of the camera. Furthermore, it is also possible to adjust the color of the head-up display to the background when an RGB imager is used as a camera.

Known from DE 198 16 647 A1 is an apparatus for improving the contrast in a head-up display in a motor vehicle. In this case, it is provided that, as viewed by the vehicle driver, a windshield of the motor vehicle is tinted dark in a specific spatial angle and that information displayed by means of the head-up display is visible for the vehicle driver in this specific spatial angle. In this way, the discernibility of the displayed information is improved. In this case, the dark-tinted part of the windshield is located in the lower region thereof, wherein only especially important information is displayed here. All information can be displayed, in addition, also in another region of the windshield that is visible for the driver in straight on alignment. Accordingly, the most important information can be read off by the vehicle driver with a minimal movement of the head, even when the piece of information that is displayed straight on is not discernible or is only discernible with difficulty on account of a lack of contrast when the brightness of the surroundings has changed or is very bright.

DE 10 2015 007 485 A1 discloses a method and an apparatus for the adaptation of image contents of a head-up display on a windshield of a vehicle. In this case, a presence of sunglasses in front of the eyes of an observer is detected as a perception condition of the image contents, and, when sunglasses are present, an optimal visibility of the image contents is adjusted by way of a change in the contrast and/or a change in a brightness and/or a change in a color of the image contents. It is possible here, for example, to utilize an image recognition method, a feature extraction based on edge detection, an analysis of reflection patterns, or an area-dependent reflectance of an auxiliary light beam in order to detect the sunglasses or the existence thereof. During reflection of the beam bundle emitted by the head-up display at the windshield, there occurs a partial polarization of the light, for which reason the method and the apparatus need to ensure at all times a reliable visibility of the image content for the driver, even when polarization effects occur.

In addition, in this context, reference is made to WO 2015/159500 A1, DE 10 2015 007 485 A1, US 2016/147073 A1, DE 100 60 536 A1, DE 43 38 579 A1, US 2011/001639 A1, WO 2015/060193 A1 and DE 10 2007 035505 A1.

An object of the present invention is to provide a method for controlling a display apparatus comprising a head-up display for a motor vehicle, such a display apparatus, and a motor vehicle having such a display apparatus, which make possible an especially good and reliable perceptibility of a depicted piece of information.

In the method according to the invention, a display apparatus for a motor vehicle having a head-up display is controlled by means of a control device, wherein, depending on a signal provided to the control device by a sensor device, a depiction of a piece of information depicted by means of the head-up display is altered. In order to make possible an especially good and reliable perceptibility of the depicted piece of information, it is provided in accordance with the invention that the signal is correlated with a color and/or a brightness of a projection background and/or with a relative movement between the projection background and a projection surface. As an alteration of the depiction of the piece of information, a height adjustment and/or a rotation of the depiction of the piece of information determined depending on the signal is then autonomously performed by the control device. In other words, the depiction of the piece of information or information is adjusted or altered taking into consideration the surroundings of the motor vehicle and/or a relation or relationship between the motor vehicle and the surroundings. In this case, the adjustment takes place, in particular, in terms of an optimization of a discernibility or perceptibility of the depicted piece of information from the perspective of a vehicle occupant or by the vehicle occupant. The adjustment or optimization of the depiction can occur, in particular, with respect to a driver or pilot of the motor vehicle, because this is especially relevant and advantageous, for example, for safety when the motor vehicle is being piloted.

Here, the projection background can be any desired surface or any desired region of the surroundings of the motor vehicle that appears superposed from the view or from the perspective of the observing vehicle occupant. The projection surface is the surface or the component at which the light that serves for the depiction of the piece of information by means of the head-up display is reflected or deflected at least partially to the eyes of the respective observing vehicle occupant. The projection surface can also be, in particular, a front window or windshield of the motor vehicle or a sub-region thereof. The height adjustment of the depiction refers to a control of the head-up display by means of which the depiction of the piece of information is displayed or appears shifted upwards or downwards in the vertical direction of the vehicle from the view or perspective of the observing vehicle occupant. This can occur independently of other alterations or adjustments. It is also possible—for example, for compensation of a tilted arrangement or a curved course of the projection surface—to make a further adjustment, such as, for example, a size adjustment, of the depiction in order to achieve a depiction that, apart from the height adjustment, is as consistent as possible. The rotation of the depiction of the piece of information refers to a control of the head-up display by means of which, from the view or perspective of the observing vehicle occupant, the depiction is displayed or appears rotated around an axis extending, in particular, in the direction of observation, preferably the longitudinal direction of the vehicle. In particular, it is possible for exclusively a height adjustment or exclusively a rotation or, in combination, both a height adjustment and a simultaneous rotation of the depiction to be performed or adjusted.

Overall, it is possible to use the method according to the invention to compensate or balance advantageously a relative movement between the projection background and the projection surface, so that, for example, an excessive or unsteady movement of the depiction of the piece of information against or relative to, that is, in relation to the projection background, that is, in relation to the vehicle surroundings, can be prevented. In this way, in an advantageous manner, the perceptibility of the piece of information is improved and it is possible to prevent any undesired physiological effects, such as, for example, dizziness, nausea, kinetosis or motion sickness, or the like, in correspondingly sensitive vehicle occupants, as a result of which the safety and/or comfort during driving of the vehicle and/or during use of the head-up display can be increased. At the same time, it is possible in this case, by taking into consideration the color and/or brightness of the projection background, in particular, of a sub-region of the projection background, and a correspondingly adjusted or matching height adjustment of the depiction, to respond, for example, to a loss of contrast and thus to a limited discernibility of the piece of information. Therefore, with a minimum of movement of the depiction being noticed by the vehicle occupant, an optimal discernibility and perceptibility is achieved. The steadiness of the depiction in relation to the projection background is especially advantageous here, because, when the motor vehicle is being driven, the attention of the driver or vehicle pilot is directed essentially at this projection background, that is, at the vehicle surroundings, and hence the projection background constitutes a visual reference. Typically, during proper operation of the motor vehicle, in particular, a passenger automobile, any relative movements that occur can lead, in the absence of a control in accordance with the method according to the invention, to discernible relative movements of the depiction with respect to the projection background. In this case, the vehicle occupant dynamically compensates for relative movements, for instance through a conscious or unconscious compensatory adjustment in posture. Accordingly, through the method according to the invention, it is advantageously achieved that the piece of information is kept permanently in a constant position from the view or perspective, that is, in the field of view or observation space, of the observing vehicle occupant, provided that the perceptibility is not limited on account of the color and/or the brightness of the projection background. In this way, in an especially effective manner, it is possible to minimize any effort required on the part of the vehicle occupant to perceive or detect the depicted piece of information, because, for example, no additional movement of the head or adjustment of an angle of view or a conscious or unconscious search for the piece of information is necessary. By way of this minimization of effort, a greater part of the driver's attention potential or information acquisition potential can be directed to driving the vehicle and to the vehicle surroundings, as a result of which the safety is also increased.

In another embodiment of the invention, it is provided that, for the determination of the height adjustment and/or of the rotation of the depiction of the piece of information, a predetermined perceptibility criterion that needs to be met by the height adjustment and/or the rotation is taken into consideration and/or evaluated. In this case, the determination of the height adjustment and/or of the rotation refers to a determination or establishment of a measure, extent, or scope of the corresponding alteration. The taking into consideration and/or the evaluation can be carried out here in each case prior to, during, and/or after the adjustment. In this case, it is also possible to provide an iterative process or a control process for the height adjustment and/or for the rotation, wherein the perceptibility criterion can be or can represent a limit value or threshold value that is to be exceeded or is not to be gone below, or else a control target. Advantageously, by the specification of the perceptibility criterion, it is possible for an objectively optimal adjustment to various situations to occur. Possible perceptibility criteria can be, for example, specific limit values or minimum values for a contrast, a brightness, or else an interval on a color scale or in a color space between the depiction of the piece of information and the projection background. It is also conceivable to establish as a perceptibility criterion a specific position and/or placement of the depiction of the piece of information. Thus, it can then be provided that the depiction is always to be displayed within a specific region or is to be perceptible from the perspective of the observing vehicle occupant, with it also being possible to alter dynamically a region of this kind in a flexible or variable manner. An example of such a region can be a respective field of view of the vehicle occupant. An example of a specific placement of the depiction as a perceptibility criterion can be, for instance, a permanently horizontally positioned representation or placement of the depiction, such as, for example, with respect to a gravity vector and/or a vehicle undersurface or the projection background. It is especially advantageous when the depiction can be found reliably and consistently by the vehicle occupant through a constant placement and the depiction is not moved so far away that it reaches the edge or outside of a field of view of the observing vehicle occupant, and then, for example, would lie or still be discernible only in the peripheral field of view.

In another embodiment of the invention, it is provided that the signal is generated depending on a magnitude and direction of alteration of a pitch angle and/or roll angle of the motor vehicle, which is detected by means of the sensor device, and the depiction of the piece of information is displayed with a height adjustment and/or with a rotation to compensate for the detected pitch angle and/or roll angle. In this case, the pitch angle describes a pivoting or tipping of the motor vehicle around an axis that extends in the transverse direction of the vehicle. This axis can extend, for example, through a center point or point of gravity of the motor vehicle—at least in relation to the longitudinal direction of the vehicle. In contrast, the roll angle describes a pivoting or tipping of the motor vehicle around an axis extending in the longitudinal direction of the vehicle. This axis, too, can extend, for example, through a center point or point of gravity of the motor vehicle—at least with respect to the transverse direction of the vehicle. Depending on the driving situation, the movement situation, the undersurface situation, and/or the surroundings situation, the height adjustment and/or the rotation of the depiction of the piece of information in or opposite to the direction of alteration of the pitch angle and/or roll angle of the motor vehicle can result or can be performed.

Preferably, the direction of adjustment and the extent or the scope of the adjustment is adapted to the respective situation in such a way that an optimal discernibility and perceptibility of the depicted piece of information ensues for the vehicle occupant, that is, from the view or the perspective of the vehicle occupant. Here, it can be provided, for example, that the position and/or placement of the depiction is kept identical or constant relative to the projection background and/or to the field of view of the vehicle occupant. In this way, in an especially advantageous manner, it is possible to realize a depiction of information that can be perceived as steadily and consistently as possible and thus in an especially fast, simple, and reliable manner. Both the magnitude and the direction of alteration of the pitch angle and/or roll angle of the motor vehicle can be sensed or detected, for example, by corresponding acceleration or angle sensors, gyroscopes, or the like.

In another embodiment of the invention, it is provided that, by means of an active chassis of the motor vehicle, a pitch angle and/or roll angle is actively adjusted, that the signal provided to the control device corresponds to this actively adjusted pitch angle and/or roll angle, and that the depiction of the piece of information is displayed with a height adjustment and/or with a rotation opposite to a direction of adjustment of the pitch angle and/or roll angle. In other words, the depiction of the piece of information can therefore be adjusted in such a way that exactly one adjustment action performed by the active chassis is compensated for. Accordingly, from a perspective that is independent of the pitch and/or roll movement of the motor vehicle, the depiction of the piece of information also remains uninfluenced by this movement and is constant. Besides the especially good discernibility and perceptibility of the piece of information, which is also advantageously realized here, the control is additionally made possible in an especially fast and precise manner in optimal time synchronization with the actively adjusted vehicle movement. Accordingly, it is possible, for example, to dispense with a complicated control mechanism or a separate sensor system. Especially advantageously, it is possible to utilize a creation or control of the depiction of the piece of information that exactly compensates for the adjustment operations of the active chassis in terms of magnitude or the scope of adjustment and in terms of the direction of adjustment when, in the case of a level or uniform undersurface and/or projection background, the active chassis performs chassis adjustments to support driving dynamics or a driving dynamics sensation.

In another embodiment of the invention, it is provided that the signal is generated depending on a color and/or brightness, detected by means of the sensor device, on a surface of a vehicle that serves as a projection background and is situated in a predetermined distance range in front of the motor vehicle, on which background the piece of information is depicted superimposed from a predetermined perspective. Furthermore, it is then provided that, on the basis of the detected color and/or brightness of the surface as well as on the basis of the respectively current depiction of the piece of information, it is checked by means of the control device whether a predetermined perceptibility criterion for the depiction is met. Moreover, it is then also provided that, when the perceptibility criterion is not met, the height adjustment of the depiction is performed in such a way that the depiction is displayed superimposed from the predetermined perspective on a surface that is different from the detected surface. In this case, the predetermined distance range may depend on a concrete embodiment or geometry of the display apparatus and of the motor vehicle. The predetermined distance range may comprise, for example, the range from 0 to 20 meters in front of the motor vehicle. It is equally conceivable that, for example, the distance range is dynamically adjusted or altered, depending on the driving situation or depending on a current adjustment with respect to the depiction of the piece of information. In any case, it is possible to provide a continuous monitoring of the distance range—at least during an operation of the sensor device and/or of the display apparatus.

As a predetermined perspective, it is possible to specify or define a typical perspective of the driver of the motor vehicle. However, it is equally conceivable that, in each case, as a predetermined perspective, an actual instantaneous perspective of the driver—or, in general, of a vehicle occupant—is used, which, for example, can be determined by means of a driver condition monitoring device known as such, or the like. Here, too, possible perceptibility criteria can be, for example, a specific limit value or minimum value for a contrast, a brightness, or else an interval on a color scale or in a color space between the depiction of the piece of information and the projection background. It is also equally conceivable here that, as a perceptibility criterion, a specific position and/or placement of the depiction of the piece of information is to be established.

Here, a detected surface refers to the surface for which the color and/or brightness was detected by means of the sensor device and which serves or served as a projection background prior to a possibly performed or to be performed height adjustment of the depiction. The other surface, which serves as a projection background after the respective height adjustment, can be a surface of the vehicle in front, but also can be another surface of the vehicle surroundings. Here, the sensor device can comprise, for example, a driver assistance camera of the motor vehicle, which, if need be, is also used for other functionalities or systems of the motor vehicle, as a result of which it is advantageously possible to avoid additional expenditure in terms of components. Through the dynamic, surroundings- or situation-dependent height adjustment of the depiction, it is advantageously possible to ensure that a height adjustment is performed only when it is necessary so as to improve or guarantee the discernibility or the perceptibility of the depicted piece of information. It is also conceivable that here—just as in the other embodiments of the invention—instead of all depicted information, only a portion thereof is depicted in a height-adjusted or rotated manner. This can be provided here, for example, when various pieces of information are depicted in different colors and/or with different brightness. Alternatively or additionally, it can also be provided that the color and/or the brightness of the depiction of the piece of information is adjusted or altered depending on the properties of the detected surface or depending on whether the perceptibility criterion is met.

Preferably, it can be provided that a color saturation, a brightness value, or a darkness level, or a relative or absolute brightness, or a light intensity is altered. In this way, it is advantageously possible to maintain an assignment of various pieces of information to various functionalities on the basis of the hue or color value. In order to avoid a complicated continuous color control, it is possible to provide, for example, two different adjustments. These adjustments can be, for example, one mode or scheme for utilization in the case of a bright projection background and another mode or another scheme for utilization in the case of a dark projection background and can comprise adjustments that are optimally matched to one another for the respectively used colors, brightness, and the like. Concretely, it can be provided, for example, that it is recognized that, from the perspective of the driver of the motor vehicle, the depiction of the piece of information is depicted superimposed on a white-lacquered trunk lid of the vehicle in front and, subsequently thereto, the depiction is adjusted in height in the vertical direction of the vehicle or shifted upwards, so that the white trunk lid of the vehicle driving in front no longer forms the projection background.

In another embodiment of the invention, it is provided that, by means of a scanning device, in particular a laser scanner, of the motor vehicle, a contour of the vehicle in front is determined and the height adjustment of the depiction of the piece of information is controlled depending on the determined contour. In other words, various components, contours, or surfaces of the vehicle in front are detected, and the height adjustment of the depiction of the piece of information can be controlled in such a way that a surface that, in regard to a perceptibility criterion, is especially suitable as a projection background, for example, actually appears from the perspective of the driver as a projection background. For example, it is possible to detect for this purpose a rear window of the vehicle in front and to utilize it as a projection background, as a result of which, with or without adjustment of a color and/or brightness of the depiction, an improved discernibility, such as, for example, a higher contrast, ensues.

In another embodiment of the invention, it is provided that an eye position and/or a field of view of a vehicle occupant, in particular of a driver, of the motor vehicle is determined by means of a monitoring device, in particular, by means of a camera, and the height adjustment of the depiction of the piece of information is controlled depending on the eye position and/or the field of view. The camera can be, for example, a camera monitoring a driver condition, for example, and can be arranged in an instrument panel or in an instrument cluster of the motor vehicle. Through a monitoring device of this kind and a corresponding control, it is advantageously possible to take into consideration the geometry of the situation, that is, the actual perspective of the vehicle occupant with respect to the depiction of the piece of Information, so that an individually adjusted optimized depiction can be realized.

In another embodiment of the invention, it is provided that, through the control of the rotation of the depiction of the piece of information, said piece of information is always depicted horizontally. In other words, the piece of information is depicted—at least during an operation of the display apparatus—horizontally with respect to the respective gravity vector and/or the respective undersurface on which the motor vehicle is moving or is situated in front of the motor vehicle in a field of vision or field of view of the vehicle occupant. In this way, in an advantageous manner, an especially good perceptibility and locatability of the depicted piece of information is ensured, because the perceptibility and locatability are simple and fast as well as consistent, regardless of the particular driving situation.

Regardless of other embodiments, it can also be provided that the control device provides data of a navigation system of the motor vehicle, or positional data or navigation data are analyzed by the control device and taken into consideration for the control of the display apparatus. It is thus possible, for example, to determine when the motor vehicle is moving on an upward slope or on a downward slope, and a degree of the upward slope or the downward slope can then enter into the control of the height adjustment of the depiction of the piece of information.

A display apparatus according to the invention for a motor vehicle comprises a head-up display, a sensor device, and a control device, by means of which a depiction of a piece of information that is produced by means of the head-up display can be altered depending on a signal provided by the sensor device to the control device. In order to ensure an especially good and reliable perceptibility of the depicted piece of information, it is provided in this case that the display apparatus is equipped to carry out at least one variant of the method according to the invention and, to this end, has a processor device and a memory storage device having a program code that codes the method steps and can be executed by means of the processor device. A display apparatus of this kind is also part of a motor vehicle according to the invention.

The functional embodiments of the invention that were described above and are also described in the patent claims, as well as the corresponding advantages, can be applied correspondingly, in an analogous manner, alternatively to the method according to the invention, the display apparatus according to the invention, and the motor vehicle according to the invention, as well as to the devices and components used for implementing the method according to the invention.

BRIEF DESCRIPTION OF THE DRAWING

Further advantages, features, and details of the invention ensue from the following description of a preferred exemplary embodiment as well as on the basis of the drawing. In this case, the sole FIGURE shows a schematic perspective illustration of an excerpt of a field of view of a driver of a motor vehicle in the direction of the windshield of the motor vehicle.

FIG. 1 Schematic perspective illustration of driver field of view.

DETAILED DESCRIPTION

The sole FIGURE shows, in a schematic perspective illustration, an excerpt of a field of vision or field of view of a driver of a motor vehicle in the direction of a windshield 1 of the motor vehicle. Between the driver, who is not illustrated here, and the windshield 1, a steering wheel 2 of the motor vehicle is depicted for definition of the perspective. In the present case, the motor vehicle has a sensor device 3, a control device 4, and a head-up display 5. The sensor device 3, the control device 4, and the head-up display 5 are connected directly or indirectly to one another by means of corresponding data cables or data links and can be connected, for example, to a CAN bus of the motor vehicle.

The depiction is to be understood here in purely schematic terms and the individual devices and, in an actual embodiment, components may comprise a plurality of individual parts, assemblies, subsystems, and the like, the arrangement of each of which is distributed spaced apart from one another in or on the motor vehicle.

In the present case, the sensor device 3 comprises at least one sensor for sensing or detecting a pitch angle and a roll angle of the motor vehicle as well as a driver assistance camera, which is arranged in a front region of the motor vehicle and by means of which the surroundings of the motor vehicle, in particular, a region in front of the motor vehicle, can be detected. In the present case, the head-up display 5 is equipped and arranged in such a way that it utilizes the front window or windshield 1 or a sub-region of the windshield 1 as a projection surface 6. Accordingly, by means of the head-up display 5, a depiction 7 of a piece of information 8 can be displayed or depicted to the driver of the motor vehicle when the sight of the driver is directed through the windshield 1 at the surroundings situated in front of the motor vehicle. In this case, this region of surroundings lying in front of the motor vehicle appears or serves as a projection background 9, on which the depiction 7 appears superimposed from a view or perspective of the driver. In the present case, the motor vehicle further comprises an active chassis, which is not illustrated here and by means of which the pitch angle and roll angle of the motor vehicle can be actively adjusted or altered. Here, it is possible, for example, to adjust or compensate for pitch angle or pitch movements of up to 3 degrees and roll movements or roll angles of up to 5 degrees.

For head-up displays in vehicles, displays known at the present time from the prior art, the position and angular position of the depicted piece of information is fixed permanently in relation to the respectively used projection surface. For the driver, for whom the projection background 9, that is, the surroundings of the vehicle, serves as a visual reference and who compensates for minor movements of the vehicle through correspondingly counteracting physical movements, there thus results, in a detrimental manner, a depiction of information that moves unsteadily in front of the projection background 9 and is inconsistent in terms of its angular position.

In order to counter these problems, it is provided in the present case that a signal is provided by the sensor device 3 to the control device 4 and, depending on this signal, the control device 4 actuates the head-up display 5 in such a way that the depiction 7 is displayed with a height adjustment and/or with a rotation. In this case, the signal can be, for example, an electric signal that corresponds to an amount and/or an alteration of a measured quantity detected by the sensor device 3. Through the control device 4, the signal can be analyzed directly and converted into corresponding control signals for the head-up display 5, or, initially, a data processing or an analysis of the signal can occur.

Also conceivable here in principle is a combination with other signals, measured quantities, or the like, which can then enter in their totality into the generation of the control signal for the head-up display 5. In the present case, it is provided that the signal correlates with a color and/or a brightness of the projection background 9 and/or correlates with a relative movement between the projection background 9 and the projection surface 6. This means that a specific signal or a signal having specific properties is generated for each of the different detected colors, brightness, and relative movements. In this case, the correlation is obviously to be understood as being one-sided, because an alteration of the color, the brightness, the position, or the angular position of the depiction 7 obviously has no influence whatsoever on the corresponding detected measured quantities.

For example, it can be provided that, by means of the active chassis, a negative pitch angle can be adjusted during an acceleration operation of the motor vehicle. This means that a front region of the motor vehicle is raised relative to a rear region and/or the rear region is lowered relative to the front region. Furthermore, it can be provided, for example, that, during travel through a curve, a roll angle is adjusted by the active chassis. Through these measures, it is possible, for example, to transmit a specific preferred driving dynamic sensation to the vehicle occupant. This can occur, in particular, also on a level undersurface, that is, for a level roadway. In particular, it is provided in the present case that, simultaneously to the adjusting operations of the active chassis, corresponding control signals are sent to the control device 4 or to the head-up display 5, and the depiction 7 is adjusted in such a way that the relative movements effected by the active chassis between the projection surface 6 and the projection background 9 are especially matched or compensated for. In other words, for a negative pitch angle of the motor vehicle, the depiction 7 is adjusted downwards in the vertical direction of the vehicle and, for a positive pitch angle, it is adjusted upwards in the vertical direction of the vehicle, this being indicated by a double arrow 10. In a corresponding way, a roll angle of the motor vehicle is compensated for in that the head-up display 5 is actuated in such a way that the depiction 7 is rotated by an angle or amount that corresponds to the respective roll angle and is opposite to the direction of alteration or direction of adjustment of the roll angle. This turning or rotation of the depiction 7 is indicated here by a double arrow 11.

In addition to the compensation of the pitch angle and/or roll angle of the motor vehicle, it is provided in the present case that, by means of the driver assistance camera, a predetermined region of 0 to 20 meters, for example, in front of the motor vehicle is monitored as to whether the depiction 7 appears superimposed on a surface with specific color and/or brightness properties from the perspective of the driver. It can be provided that specific color and/or brightness properties are predetermined and the depiction is adjusted in height during the detection thereof. However, it can also be provided that, dynamically—for example, taking into consideration the color and/or the brightness of the respectively current depiction 7 and/or the brightness of the surroundings—a perceptibility criterion for the respectively current depiction 7 is evaluated. If, for example, as a perceptibility criterion, a minimum contrast ratio or a minimum color value difference between the color of the detected surface that forms the respectively current projection background 9 and the color of the depiction 7 is defined, then, when the particular minimum value is exceeded, the depiction 7 is adjusted in height, that is, depicted at another position, so that a region that then forms the new projection background 9 ensures an improved discernibility of the depiction 7—for example, in the form of a higher contrast ratio and/or of a larger color value interval.

Preferably, in this case, the sensor device 3 comprises a laser scanner, by means of which a contour of a vehicle in front in the predetermined distance range is detected. By means of the laser scanner, it is then possible, for example, to determine a respective contour of a rear window of the vehicle in front. Subsequently, the depiction 7 is then adjusted in height in such a way that the rear window appears as a projection background. For an especially exact determination of which surface or which surface region or sub-region of the surroundings of the motor vehicle actually forms the respective projection background 9 from the perspective of the driver, the motor vehicle is equipped with a camera 12 monitoring the condition of the driver in the present case. This driver-condition monitoring camera 12 is arranged here in an instrument cluster of the motor vehicle, as a result of which it is advantageously possible to detect or determine a face, and thus, in particular, a position of the eyes of the driver and a corresponding direction of view or a corresponding field of vision or field of view of the driver. From this data, acquired by means of the driver-condition monitoring camera 12, it is thus possible to determine the actual perspective of the driver and to use it for the control of the position and angular position of the depiction 7.

In principle, it is also conceivable that, instead of the windshield 1, another component can serve as a projection surface 6. For example, between the steering wheel 2 and the windshield 1, it is possible to arrange a projection screen, which, for example, can be a component of a retrofittable head-up display 5. Depending on the actual specific embodiment of the head-up display 5 and the projection surface 6 that is used, it is possible to realize the height adjustment and the rotation of the depiction 7 in a different way. For example, a mirror can be positioned in the beam path of the head-up display 5 in a movably controllable manner and/or the retrofitted projection screen can be positioned so that it can be inclined or tilted.

The invention claimed is:

1. A method for controlling a display apparatus, the method comprising:
receiving, on the control device, from a sensor device, a signal, identifying, with the control device, based on the signal, at least one of a color and a brightness of a projection background, and determining, based on the signal, if there has been a relative movement between the projection background and a projection surface,
wherein the signal is generated depending on each of: at least one of a color and a brightness, detected by means of the sensor device, of a surface of a vehicle in front in a predetermined distance range in front of the motor vehicle, said surface serving as a projection background on which a piece of information is depicted in a depiction superimposed from a predetermined perspective, and a magnitude and direction of alteration of at least one of a pitch angle and a roll angle of the motor vehicle detected by means of the sensor device,
according to a predetermined sequence, checking, by means of the control device on the basis of the at least one of the detected color and the detected brightness of the surface, whether a predetermined perceptibility criterion for the depiction is met based on the at least one of the detected color and the detected brightness of the surface, and checking, by means of the control device on the basis of the respective current depiction of the piece of information and a determination of whether there has been a relative movement between the projection background and the projection surface, whether the predetermined perceptibility criterion for the depiction is met based on relative movement, and
upon a determination that the perceptibility criterion is not met, based on at least one of the predetermined perceptibility criterion not being met based on the at least one of the detected color and the detected brightness of the surface and the predetermined perceptibility criterion not being met based on the relative movement, triggering the control device to autonomously perform a specific adjustment of the depiction of the piece of information, the specific adjustment comprising at least one of a height adjustment based on the signal and a rotation based on the signal, said specific adjustment altering the depiction to be depicted superimposed from the predetermined perspective on a second surface different from the surface, wherein said height adjustment comprises determining, with a scanning device of the motor vehicle, a contour of the vehicle in front, and controlling the height adjustment depending on the determined contour.

2. The method according to claim 1, wherein the method further comprises determining the specific adjustment of the depiction of the piece of information based on a predetermined perceptibility criterion to be met by the adjustment.

3. The method according to claim 1, wherein by means of an active chassis of the motor vehicle, at least one of a pitch and a roll angle is actively adjusted, said at least one of the actively adjusted pitch angle and the actively adjusted roll angle corresponding to the signal provided to the control device, and the depiction of the piece of information is depicted as at least one of adjusted in height and rotated opposite to a direction of adjustment of the at least one of the pitch angle and the roll angle.

4. The method according to claim 1, wherein the scanning device is a laser scanner.

5. The method according to claim 1, wherein at least one of an eye position and a field of view of a vehicle occupant, in particular a driver, of the motor vehicle is determined by means of a monitoring device, in particular by means of a camera, and the height adjustment of the depiction of the piece of information is controlled depending on the at least one of the eye position and the field of view.

6. The method according to claim 1, wherein through the control of the rotation of the depiction of the piece of information, said piece of information is always depicted horizontally with respect to at least one of a respective gravity vector and a respective undersurface, on which the motor vehicle is moving or which is situated in front of the motor vehicle in a field of view of a vehicle occupant.

7. The method according to claim 1, wherein by means of the scanning device, a contour of a rear window of the vehicle in front is determined, and the depiction of the piece of information is depicted superimposed on the rear window from the predetermined perspective.

8. The method according to claim 1, wherein the height adjustment of the depiction of the piece of information is controlled in each case depending on a path information provided by a navigation system, in particular, an upward slope or a downward slope of a path segment currently traveled by the motor vehicle.

9. A display apparatus for a motor vehicle, having a heads-up display, a sensor device, and a control device, by means of which a depiction of a piece of information, produced by means of the head-up display, can be altered depending on a signal provided to the control device by the sensor device, wherein the display apparatus further comprises a processor device and a memory storage device containing program code that, when executed on the processor device, is configured to perform steps of:
receiving, on the control device, from the sensor device, the signal, identifying, with the control device, based on the signal, at least one of a color and a brightness of a projection background, and determining, based on the signal, if there has been a relative movement between the projection background and a projection surface,
wherein the signal is generated depending on each of: at least one of a color and a brightness, detected by means of the sensor device, of a surface of a vehicle in front in a predetermined distance range in front of the motor vehicle, said surface serving as a projection background on which the piece of information is depicted superimposed from a predetermined perspective, and a magnitude and direction of alteration of at least one of a pitch angle and a roll angle of the motor vehicle detected by means of the sensor device,
according to a predetermined sequence, checking, by means of the control device on the basis of the at least one of the detected color and the detected brightness of the surface, whether a predetermined perceptibility criterion for the depiction is met based on the at least one of the detected color and the detected brightness of the surface, and checking, by means of the control device on the basis of the respective current depiction of the piece of information and a determination of whether there has been a relative movement between the projection background and the projection surface, whether the predetermined perceptibility criterion for the depiction is met based on relative movement, and upon a determination that the perceptibility criterion is not met, based on at least one of the predetermined perceptibility criterion not being met based on the at least one of the detected color and the detected brightness of the surface and the predetermined perceptibility criterion not being met based on the relative movement, triggering the control device to autonomously perform a specific adjustment of the depiction of the piece of information, the specific adjustment comprising at least one of a height adjustment based on the signal and a rotation based on the signal, said specific adjustment altering the depiction to be depicted superimposed from the predetermined perspective on a second surface different from the surface, wherein said height adjustment comprises determining, with a scanning device of the motor vehicle, a contour of the vehicle in front, and controlling the height adjustment depending on the determined contour.

* * * * *